United States Patent [19]
Shankoff

[11] 3,839,110
[45] Oct. 1, 1974

[54] CHEMICAL ETCHANT FOR PALLADIUM

[75] Inventor: Theodore Arthur Shankoff, Mendham, N.J.

[73] Assignee: Bell Telephone Laboratories, Incorporated, Murry Hill, N.J.

[22] Filed: Feb. 20, 1973

[21] Appl. No.: 333,791

[52] U.S. Cl. .................... 156/8, 117/212, 117/217, 156/18, 204/15, 252/79.2
[51] Int. Cl. .................... C23f 1/02
[58] Field of Search .................... 252/79.1, 79.2; 156/3, 156/8, 17, 18; 117/212, 217; 204/15, 32

[56] References Cited

UNITED STATES PATENTS 3,686,080 8/1972 Banfield et al. .................... 156/17 X
3,775,200 11/1973 Nobel .................... 156/17

*Primary Examiner*—William A. Powell
*Attorney, Agent, or Firm*—W. G. Nilsen

[57] ABSTRACT

A process is described for the fabrication of devices in which thin films of palladium are etched by a chemical procedure. This chemical procedure involves first oxidation of the palladium metal to palladium ions and then complexing of the palladium ion and dissolution in the etching solution. Dichromate ion is used as the oxidizing agent and chloride ion as the complexing agent. This chemical etching solution yields patterns of high resolution with high reliability.

6 Claims, No Drawings

CHEMICAL ETCHANT FOR PALLADIUM

BACKGROUND OF THE INVENTION

1. Field of the Invention

The invention relates to a process for making devices in which palladium thin films are involved in the fabrication procedure. In particular, the invention relates to the chemical etching procedure for palladium.

2. Description of the Prior Art

In the fabrication of many thin film devices palladium thin films play an important part. It is used to prevent diffusion of one metal into another metal, for example, the diffusion of titanium into gold. It is also used as a surface for plating gold, copper and various other metals. In particular, palladium is a common catalytic surface for electroless gold plating.

Patterns of palladium are often required in the fabrication of palladium thin film devices. These patterns are usually produced by etching. It is desirable to have uniform and rapid etching rate so as to permit fabrication of patterns of high resolution in reasonable times. Short processing times are not only economically advantageous but also minimizes attack and undercutting on the photoresist. The limitation on short processing time is the requirement that palladium be completely removed from the etched area so as to prevent, for example, catalytic deposition in a subsequent processing step. Compatability with other surfaces (for example, gold surfaces) is desirable in some processes.

At present a variety of procedures are used to etch palladium thin films. In one such procedure triiodide ion is used as the etchant, and in another a mixture of nitric acid and hydrochloric acid is used in the etching solution. Complete removal of palladium is difficult with these etches requiring extensive periods of time and some photoresists are attacked by these etches.

SUMMARY OF THE INVENTION

The invention is a process for the fabrication of palladium thin film devices in which the palladium is etched with an aqueous solution of dichromate ion and chloride ion. Hydrogen ion is also included in the solution to promote the etching reaction. The dichromate ion concentration may vary from 0.005M to 0.5M but 0.005M to 0.3M is preferred on the basis of etchant stability and pattern edge acuitance. The concentration of chloride ion may vary from 0.1M to 5M but where pitting may cause problems in device reliability, chloride concentration should be limited to 1M. Hydrogen ion concentration may vary from 0.05M to 5M. Initial ingredients for attaining the above ionic concentrations may vary including the addition of strong or weak acids for the hydrogen ion concentration, salts for the chloride concentration et cetera. Both hydrogen ion and chloride ion may be added as hydrochloric acid. Particularly good resolution and uniformity is obtained from an aqueous solution containing from 40–75 volume percent phosphoric acid in $H_2O$ with dichromate concentration from 0.02M to 0.03M and chloride concentration from 0.5M to 0.7M and in which between 0.5M and 0.7M of hydrogen ion is added to the solution. The hydrogen ion and chloride ion are conveniently added as HCl. This etchant is compatible with exposed gold surfaces, does not degrade commonly used photoresists, removes palladium completely so that electroless gold does not deposit where palladium has been etched away. It etches at reasonable and uniform rates so as to produce patterns of high resolution which is desirable in device fabrication. Etching rate may be increased by heating the etching solution.

DETAILED DESCRIPTION

1. Mechanism of the Palladium Oxidation

An understanding of the invention is facilitated by a description of the mechanism by which dichromate ion oxidizes metallic palladium in the presence of chloride ion. Examination of the individual oxidation reduction reactions reveals that this oxidation process proceeds by the following chemical equation.

$$Cr_2O_7^{=} + 14H^+ + 3Pd + 12Cl^- \rightarrow 2Cr^{+++} + 7H_2O + 3PdCl_4^{=} \qquad (1)$$

Particularly pertinent with regard to this reaction is that hydrogen ions are necessary to promote the oxidation reaction. Thus it is necessary that the solution be acidic. Furthermore, chloride ions also promote the oxidation reaction because they complex with the palladium ions liberated in the oxidation reaction. Increasing the concentration of dichromate ion also promotes the oxidation reaction.

2. Composition of the Etching Solution

The essential ingredients in the etching solution, namely, dichromate ions, hydrogen ions and chloride ions, may be added in a variety of ways. For example, dichromate ion may be added as metal dichromate such as potassium dichromate or by other means such as the addition of other compounds which yield dichromate ion in acidic aqueous solution, e.g., metal chromates which equilibrate at low pH to form dichromates.:

$$2CrO_4^{=} + 2H^+ \rightarrow Cr_2O_7^{=} + H_2O \qquad (2)$$

or $CrO_3$ hydrolysis:

$$2CrO_3 + H_2O \rightarrow Cr_2O_7^{=} + 2H^+ . \qquad (3)$$

There are practical limitations to the concentration of dichromate ions. Below 0.005M the rate of etching is insufficient for practical applications. Above approximately 0.5M, the oxidizing properties of the etching solution often have a detrimental effect on photoresists commonly used in device fabrication and on etchant stability. A concentration range of from 0.005M to 0.3M is preferred since etching rates are usually satisfactory from a practical point of view and commonly used photoresists are not affected.

The concentration of chloride ion may also vary over a considerable range. However, below 0.1M etching rates are often adversely affected because insufficient chloride ion is available for rapid complexing with the palladium ions liberated in the etching reaction. Also, too high a concentration of chloride ion leads to pitting on the device surface edges which adversely affect both the device characteristics and yield. Such pitting, for example, limits the resolution obtainable in the device and leads either to open circuits where the path should be conducting, or shorting across insulating paths. Above 5M concentrations of chloride ion pitting is pronounced.

As remarked above, hydrogen ions must be supplied to promote the oxidation reaction. Hydrogen ions can be added to the etching solution in a variety of ways, such as adding strong or medium strength acid, or even by the addition of weak acids. Hydrogen ion concentration may vary from as little as 0.05M up to 5M. Although the etching solution may operate below 0.05M in practical applications where the etching solution is used over a reasonable period of time and where etching rate must be reasonably high, hydrogen ion concentrations below 0.05M are not usually satisfactory. Above 5M photoresists often used in device fabrication might be adversely affected and in addition higher concentrations does not increase etching rate.

A particular composition, which is convenient and gives excellent results as par as high and uniform etching rates is the following: dichromate concentration 0.2–0.3M, and hydrochloric acid concentration 0.5–0.7M in an aqueous solution of from 40–75 volume percent phosphoric acid.

3. An Illustrative Example

The invention may be understood by a description of an example. The process is carried out on wafers made of silicon upon whose surface is grown 1,000–7,000 angstroms of silicon dioxide. Initially a titanium film is put down on the silicon dioxide surface. Then a palladium layer is put down on top of the titanium layer. The layers are put down by filament or *e*-gun evaporation or sputtering. Then the photoresist processing is carried out. After obtaining the photoresist pattern on the palladium, the etching step is carried out. The etching solution consisted of 0.025M of potassium dichromate and 0.6M HCl in aqueous 60 volume percent $H_3PO_4$. Typically etching was carried out in this solution by agitating the wafer for approximately 60 seconds. Then, the remaining photoresist is removed and the surface is cleaned by conventional methods. Using the process described above, essentially exact duplication of a photoresist pattern down to features as fine as 1.3 micron gap separation of 4.7 micron wide pads is obtained.

Further processing is carried out to make the palladium path more conducting. This is done by putting a conductive metal on the palladium. Gold is put on top of the palladium by electrolessly plating the gold. A particular advantage of the etching process for palladium is that the palladium is completely removed so no electroless gold is deposited in areas from which the palladium is removed. This permits fabrication of conducting paths with close tolerances without excessive shorts across different conducting paths.

Further processing steps might involve removal of the exposed titanium. Note that the titanium can be removed prior to electroless gold plating as well as removed afterwards. This can be done using either the resist-palladium combination as the etch mask or the palladium pattern above. Also, gold plating might be done by an electrolytic rather than electroless process.

This process may be used on a large variety of electrical devices requiring conductive paths, but is especially adaptable to integrated circuit type devices where conducting paths are of small dimensions. These devices include those put on a semiconductor surface, such as a transistor or on a magnetically active surface, such as a magnetic device or other signal processing circuit which might be put on an inactive surface.

What is claimed is:

1. A process for the fabrication of devices containing a palladium film by a series of steps including producing a palladium pattern by wetting a composite surface including bared palladium and resist with an aqeuous, acidic etching solution containing chloride ion and in which the palladium film to be retained is protected by resist characaterized in that the aqueous acidic etching solution contains from 0.005M to 0.5M dichromate ion, from 0.1M to 5M of the chloride ion and from 0.05M to 5M hydrogen

2. The process of claim 1 in which the concentration of the dichromate ion in the acidic etching solution is between 0.005and 0.3M.

3. The process of claim 1 in which the aqueous acidic etching solution contains from 40–75 volume percent phosphoric acid.

4. The process of claim 1 in which the dichromate concentration is between 0.2M and 0.3M, the chloride concentration is between 0,5M and 0.7M and the hydrogen ion concentration is between 0.5M and 0.7M.

5. The process of claim 1 in which the aqueous acidic etching solution contains from 40–75 volume percent phosphoric acid and in which the dichromate concentration is between 0.2M and 0.3M, the chloride concentration is between 0.5M and 0.7M, and the hydrogen ion concentration is between 0.5M and 0.7M in addition to those supplied by the phosphoric acid.

6. The process of claim 5 in which the said aqueous acidic etching solution consists essentially of the ions mentioned and a cation to ionically balance the aqueous acidic solution.

* * * * *

UNITED STATES PATENT OFFICE
CERTIFICATE OF CORRECTION

Patent No. 3,839,110 Dated October 1, 1974

Inventor(s) Theodore Arthur Shankoff

It is certified that error appears in the above-identified patent and that said Letters Patent are hereby corrected as shown below:

Column 3, line 13, change "par" to --far--.

Column 4, line 25, after "hydrogen" insert --ion.--.

Signed and sealed this 24th day of December 1974.

(SEAL)
Attest:

McCOY M. GIBSON JR.
Attesting Officer

C. MARSHALL DANN
Commissioner of Patents